(12) United States Patent
Melchior et al.

(10) Patent No.: US 6,209,519 B1
(45) Date of Patent: Apr. 3, 2001

(54) METHOD AND ARRANGEMENT FOR CONTROLLING THE QUIET RUNNING OF AN INTERNAL COMBUSTION ENGINE

(75) Inventors: Gerard Melchior, Schwieberdingen; Klaus Ries-Müller, Bad Rappenau, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/466,978

(22) Filed: Dec. 17, 1999

(30) Foreign Application Priority Data

Dec. 21, 1998 (DE) .............................. 198 59 074

(51) Int. Cl.⁷ ....................................... F02P 5/15
(52) U.S. Cl. .................. 123/406.24; 123/436; 701/111
(58) Field of Search ............................. 123/435, 406.24, 123/403.26, 406.27, 436; 701/111

(56) References Cited

U.S. PATENT DOCUMENTS

| | | | |
|---|---|---|---|
| 4,535,406 | * | 8/1985 | Johnson ............................ 123/436 |
| 4,688,535 | | 8/1987 | Küttner et al. . |
| 4,706,628 | * | 11/1987 | Trombley ............................ 123/435 |
| 4,875,451 | * | 10/1989 | Evasick et al. ..................... 123/435 |
| 4,936,277 | * | 6/1990 | Deutsch et al. .................... 123/436 |
| 5,605,132 | * | 2/1997 | Hori et al. ......................... 123/436 |
| 5,709,192 | * | 1/1998 | Zimmermann ..................... 123/436 |
| 5,740,780 | * | 4/1998 | Shimizu et al. .................... 123/435 |
| 5,775,299 | * | 6/1998 | Ito et al. ............................ 123/436 |
| 5,822,710 | | 10/1998 | Mezger et al. . |
| 5,861,553 | | 1/1999 | Janetzke et al. . |
| 6,002,980 | * | 12/1999 | Taylor et al. ....................... 123/436 |
| 6,021,758 | * | 2/2000 | Carey et al. ........................ 123/436 |
| 6,024,070 | * | 2/2000 | May et al. .......................... 123/436 |

* cited by examiner

*Primary Examiner*—Erick Solis
(74) *Attorney, Agent, or Firm*—Walter Ottesen

(57) ABSTRACT

The invention is directed to a method and an arrangement for equalizing torque contributions of different cylinders of an internal combustion engine to the total torque of the engine. The engine can operate in an overrun mode and in a fired mode. First quantities (Ka) are provided of a rough running of the engine in the overrun mode and second quantities (Kvi) are provided in the fired mode. Third quantities (Ksi) for a rough-running component based on torsion vibrations are also provided. Cylinder-individual fourth quantities (Kki) for the rough running are formed from the first, second and third quantities with the fourth quantities being independent of the rough running in the overrun mode and independent of the rough-running component based on the torsion vibrations. The torque contributions are equalized on the basis of the fourth quantity.

9 Claims, 3 Drawing Sheets

METHOD AND ARRANGEMENT FOR CONTROLLING THE QUIET RUNNING OF AN INTERNAL COMBUSTION ENGINE

BACKGROUND OF THE INVENTION

The invention relates to the improvement of the quiet running of an engine by equalizing the torque components of the individual cylinders as to the total torque of an internal combustion engine. Here, the engine can be a spark-ignition engine or a diesel engine. A detection of the actual torque of a cylinder takes place via an evaluation of the time-dependent course of the rotation of the crankshaft or of the camshaft. A torque correction takes place via an intervention on at least one of the variables: injected fuel quantity, air quantity or ignition time point in a spark-ignition engine, exhaust-gas return rate, injection position or cylinder compression. The term "injection position" relates to the angular position of an injection pulse to a reference point such as top dead center of the piston of a cylinder in a combustion stroke.

A method for cylinder equalization is disclosed in U.S. Pat. No. 4,688,535. In this method, segment times are detected to evaluate the time-dependent course of the rotational movement of the crankshaft or camshaft. Segment times are the times in which the crankshaft or camshaft passes through a predetermined angular region assigned to a specific cylinder. The more uniformly the engine runs, the lesser are the differences between the segment times of the individual cylinders. From the above-mentioned segment times, an index for the rough running of the engine can therefore be formed. In the known method, a controller is assigned to each cylinder of the engine and a rough-running actual value specific to a cylinder is supplied to the controller as an input signal. The rough-running values of several cylinders are averaged to form the desired control value. The mean value serves as the desired value. At the output end, the controller influences the cylinder-specific injection time and therefore the cylinder-individual torque contribution such that the cylinder-individual rough-running actual value approaches the desired value.

Rough-running values, which are obtained from rpm signals, are also used for detecting combustion misfires. Quotients are formed as rough-running values LUT in the method disclosed in U.S. Pat. No. 5,861,553. In the numerator of these quotients, differences of sequential segment times are present and the denominator of these quotients contains the third power of one of the participating segment times. This quotient can be weighted with additional factors as well as be provided with a dynamic correction which considers rpm changes of the entire engine. With respect to the formation of rough-running values, U.S. Pat. No. 5,861,553 is incorporated herein by reference. The sum of these rough-running values, which is formed over one camshaft rotation, is equal to zero for a constant engine rpm.

The detection of defects of the transducer wheel system as well as the detection of the component of the rough running which is based on torsion vibrations of the crank drive and on different energy releases in different cylinders, is known from U.S. Pat. No. 5,822,710.

The detected defects and the above-mentioned rough-running component serve to provide a computed correction of the rough-running values for the detection of combustion misfires. For example, in overrun operation with a six-cylinder engine, the segment times (t1, t2, t3) of the three transducer wheel segments are detected. At each segment time, a corrective value (K1, K2, K3) is formed and additively or multiplicatively coupled to the segment time (Kt1= t1*K1 or t1*K1, . . . ). The corrective values are so determined that the results Kti (wherein i=1 to 3) are equal to each other. Such a correction considerably improves the quality of the detection of combustion misfires which is based on the evaluation of rpm fluctuations.

SUMMARY OF THE INVENTION

It is an object of the invention to minimize the real cylinder-individual differences in the combustion between the cylinders with a control concept. The torque components of the cylinders are then of the same magnitude. The real differences here characterize the rough-running component which is based on different combustion but not on torsion vibrations and/or transducer wheel defects.

The electronic control arrangement of the invention is for equalizing torque contributions of different cylinders of an internal combustion engine to the total torque of the engine which can operate in an overrun mode and in a fired mode. The electronic control arrangement includes: means for providing first quantities (Ka) of a rough running of the engine in the overrun mode and second quantities (Kvi) in the fired mode; means for providing third quantities (Ksi) for a rough-running component based on torsion vibrations; means for forming cylinder-individual fourth quantities (Kki) for the rough running from the first, second and third quantities with the fourth quantities being independent of the rough running in the overrun mode and independent of the rough-running component based on the torsion vibrations; and, means for equalizing the torque contributions on the basis of the fourth quantity.

Especially advantageous effects occur during idle and in the lower part-load range because these ranges exhibit especially intense smooth running effects or rough-running effects as a consequence of varying torque components of different cylinders.

The combination of the above features permits a separation of the influences of different causes of rpm fluctuations. These influences are described below as items (a) to (c).

Item (a)

Disturbances, which are caused by defects of the rpm detection system, occur synchronously with the rotation movement of the transducer wheel and are synchronous to the rotational movement thereof because of the coupling of the transducer wheel to the crankshaft. These disturbances are independent of load and can be learned during overrun operation. For example, for an eight-cylinder engine, four corrective values KA, KB, KC and KD can be formed.

Item (b)

Non-uniformities, which are based on torsion vibrations of the crank drive are mostly synchronous to the rotation movement of the camshaft and typically at specific resonance rpms. The vibration components are independent of deterioration and can be computed. The vibration components can also be determined utilizing measurements as an alternative to a computation. For an eight-cylinder engine, there are eight corrective values KS1, . . . ,KS8, which can be stored in a corrective characteristic field of the engine control apparatus.

Item (c)

Differences because of the combustion process, for example, because of varying cylinder charges, are synchronous to the rotation of the camshaft and are dependent upon deterioration because of different wear of the cylinder/piston pairing. In the following, these differences are assigned eight corrective values (Kv1, . . . ,Kv8) in the example of an eight-cylinder engine.

An essential element of the invention is to intervene in the management of the engine based on the above-mentioned corrective values so that the torque components of the different cylinders are equalized.

In this context, the computed correction of the mechanical faults of the segment time detection system (transducer wheel tolerances) is especially important in the detection of the segment times during overrun operation because these would otherwise be controlled out by a controlled intervention. The consequence would be a real physical rough running which would generate a signal of perfect smooth running in combination with the mechanical defects.

According to the invention, corrective values Kvi are learned in fired operation; and, in overrun operation, corrective values Ka, Kb, . . . , et cetera are learned and are coupled to predetermined corrective values Ksi.

What is decisive in the computation of the corrective values is that the different systematic disturbance components are considered separately. What is essential in this context is especially the use of predetermined values for the torsion vibration effects because these effects cannot be separated effectively in a simple manner from the other effects neither in overrun operation nor in fired operation.

From the corrective value Kvi of a cylinder having index I, the corresponding corrective values Ksi and Ka are subtracted, that is, the corrective values Ksi, Ka, . . . concerning the same cylinder or the same crankshaft angle segment. Example: Kk1=Kv1−Ks1−Ka.

The result Kki of the subtraction corresponds to a difference between cylinder-individual rough-running values. This difference is based only on different torque components and is independent of transducer wheel inaccuracies as well as torsion vibrations. Stated otherwise, the corrective values Kki reflect torque differences based on varying energy releases in the combustion processes individual to a cylinder. The differences are compensated by corresponding control interventions of the engine management.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
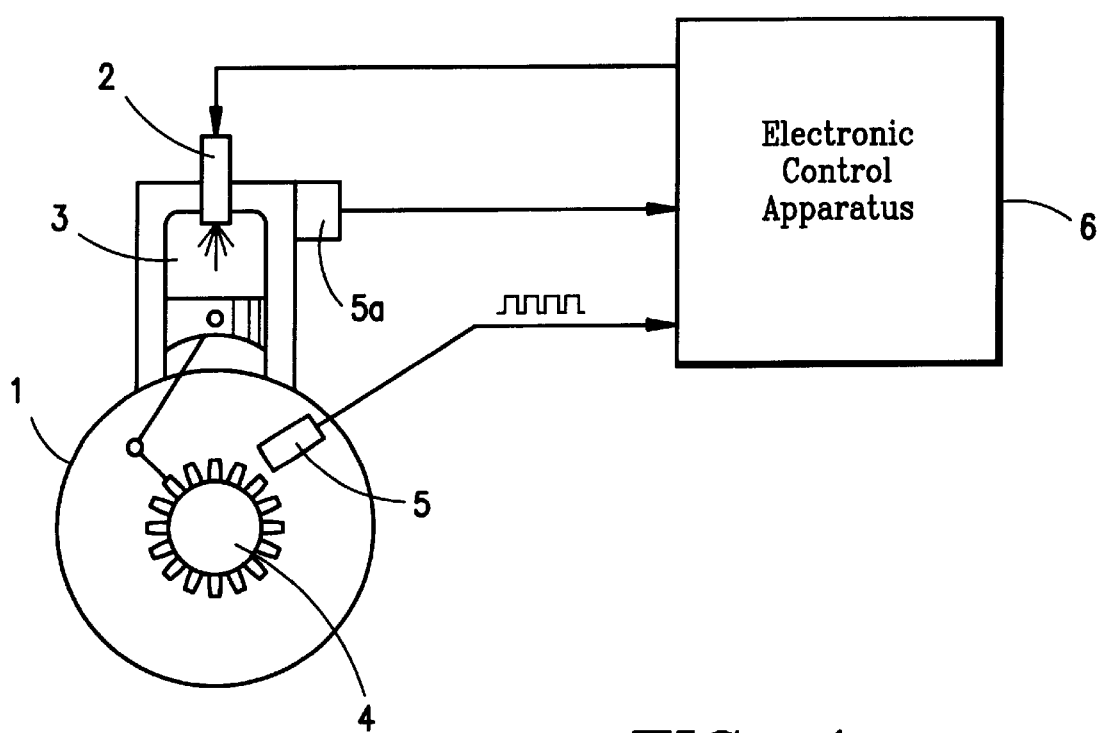
FIG. 1 shows the technical background of the electronic control arrangement for equalizing the torque components of different cylinders of an internal combustion engine to the total torque.

Reference numeral 1 in FIG. 1 represents a spark-ignition engine having direct injection which is exemplified by a high pressure injection valve 2 which projects into the combustion chamber 3 of the engine. FIG. 1 also shows a transducer wheel 4, sensors 5 and 5a and an electronic control apparatus 6. The control apparatus 6 receives signals from the sensors 5 and 5a and, for example, outputs an injection pulsewidth as an actuating variable tik to a high pressure injection valve of an individual cylinder. Additional actuating variables outputted by the engine manager (that is, the electronic control apparatus 6 for balancing torque) can be the injection time point, the ignition time point, the supplied air quantity and/or the returned exhaust-gas quantity.

For the equalizing intervention, cylinder-individual rough-running values are formed in the electronic control apparatus 6 and are processed to corrective values which influence the torque via a computation into the actuating variables such as into the cylinder-individual injection times and therefore influence the time-dependent sequence of the rotation of the transducer wheel 4.

Figure 2:
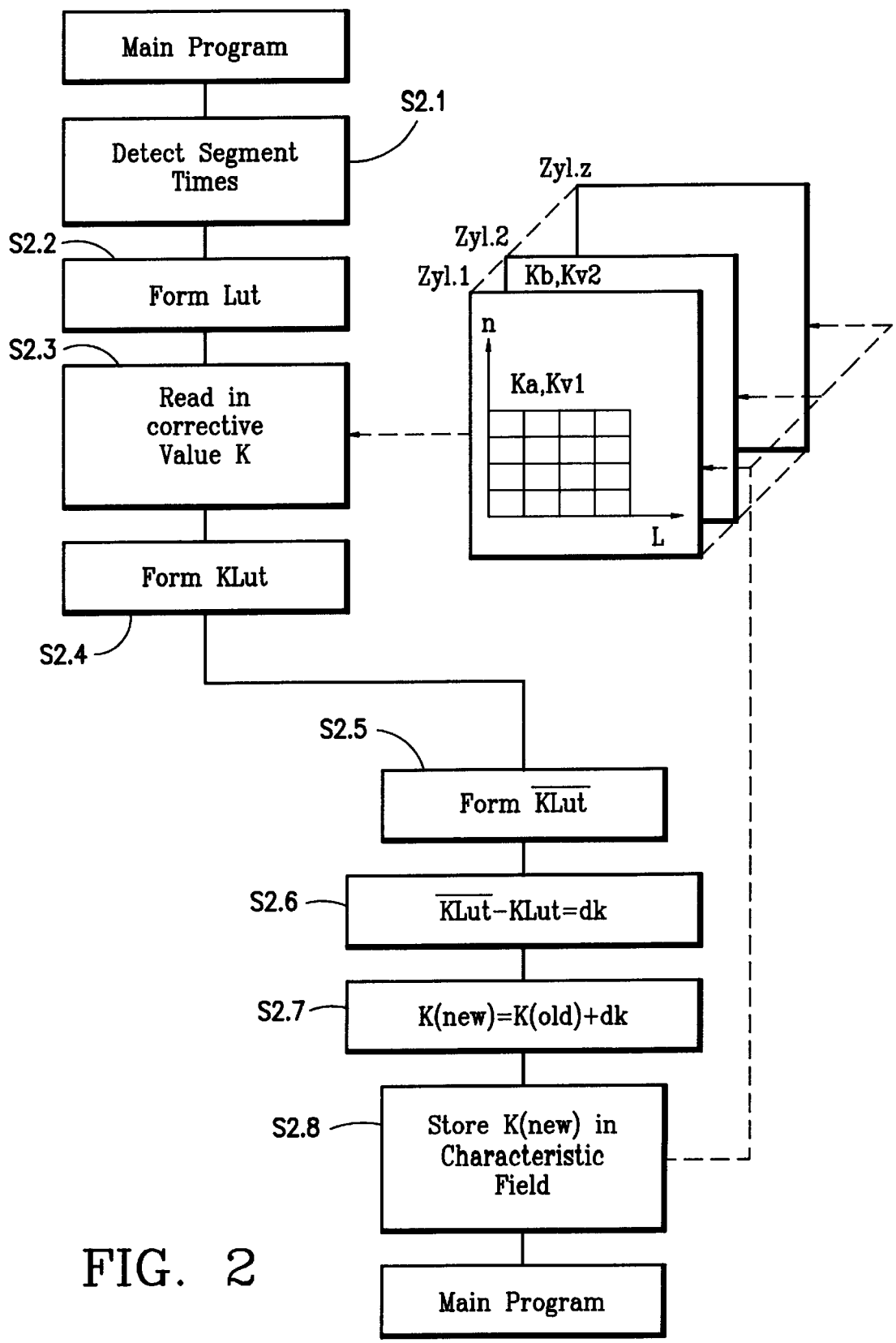
FIG. 2 is a flowchart showing an example of a determination of the corrective values for the detection of the engine rpm; and, FIG. 3 is a schematic of an embodiment of the electronic control arrangement according to the invention.

FIG. 2 shows an example of determining the corrective values for the rpm detection.

For this purpose, ignition synchronous segment times are detected in step S2.1 and processed to rough-running values Lut in step S2.2. In step S2.3, a corrective value for compensating the torque vibrations and similar effects is read in from a load/rpm characteristic field K(L,n). In the first runthrough of the method, it is only a plausible or neutral value which successively assumes, via repeated method runthroughs, a value which is characterized in that the corrected rough-running values of different cylinders become equal to each other. For this purpose, the rough-running values Lut are coupled to the corrective value K in step S2.4. Thereafter, the corrected rough-running value KLut enters into the formation of a mean value $\overline{KLut}$ in step S2.5. Step S2.6 follows for determining the deviation dK of the actual value $\overline{KLut}$ from the mean value KLut. In step S2.7, a new corrective value K(new) is formed by addition of the deviation dK to old corrective value K(old) and is written into the characteristic field K(n,L) of the cylinder via step S2.8. The cylinder being that cylinder for which the rough-running value was determined.

By repeated runthroughs of the described sequence of steps, the characteristic field values K of the various cylinders become such that no deviations of the corrected rough-running values of the various cylinders occur any longer amongst each other during misfire-free normal operation. The characteristic field values K belong to an operating point.

The cylinder-individual characteristic fields can contain the corrective values Ka et cetera from the overrun operation as well as the corrective values Kv from the fired operation. The corrective values from the overrun operation are stored with the load value zero.

The described method for the corrective values Ka et cetera and Kv can be carried out repeatedly during the operation of the engine.

The corrective values Ks are, in contrast, predetermined and stored via computation or via a measuring detection ahead of or during the first time that the engine is taken into service. These corrective values Ks are not changed again during operation of the engine and can be called up in dependence upon the operating point.

Figure 3:
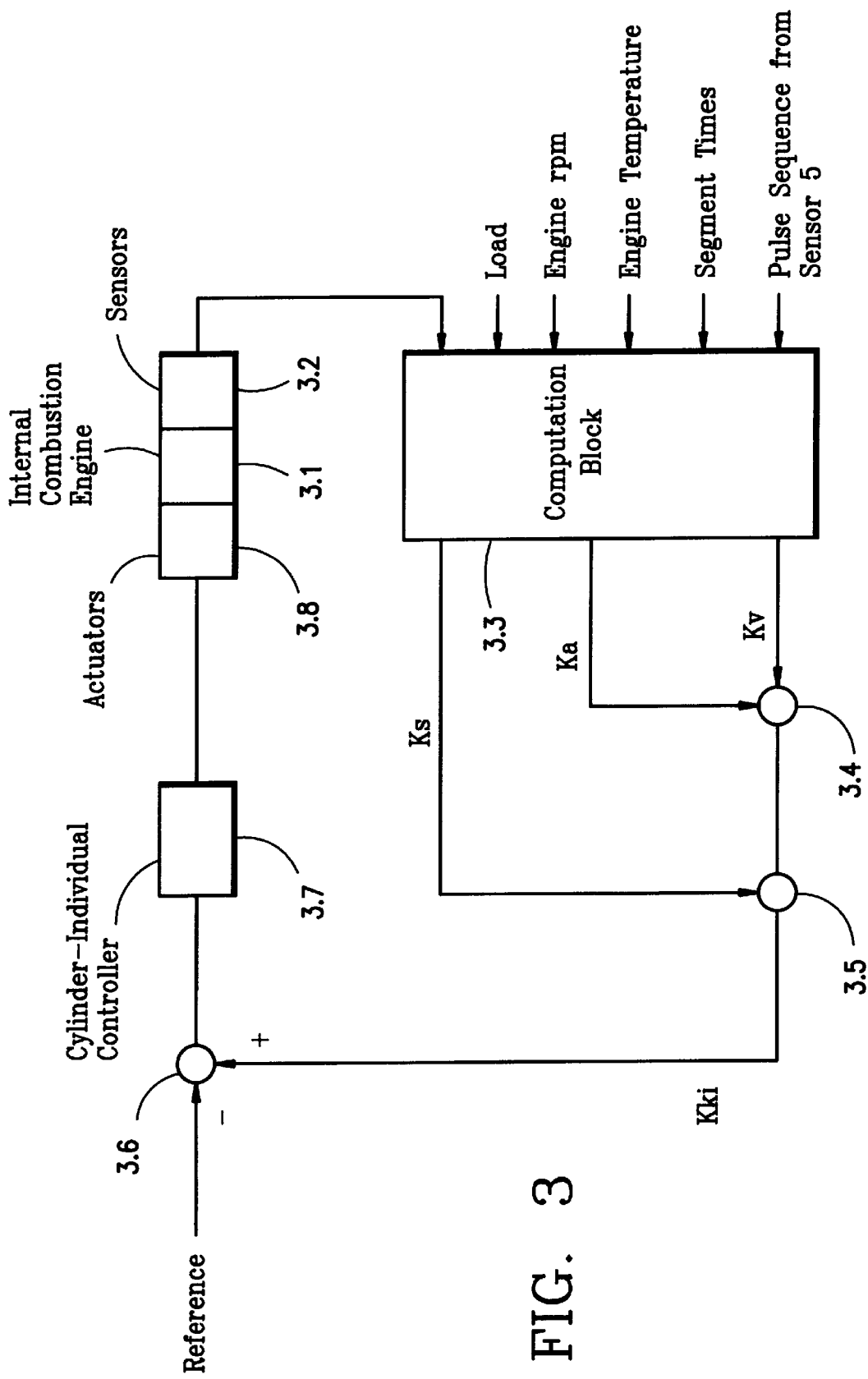

FIG. 3 discloses an embodiment of the invention. A sensor 3.2 detects operating parameters of the engine 3.1. Examples of operating parameters are: load, rpm, engine temperature, cylinder identification signal, segment times or the pulse sequences which form the basis of the segment times. The pulse sequences are from the rpm detection system made up of transducer wheel 4 and inductive pickup 5 shown in FIG. 1.

These values are supplied to a computation block 3.3. Block 3.3 as well as components 3.4 to 3.7 belong to the control apparatus 6.

The corrective values are formed in block 3.3. This can take place, for example, in correspondence to the illustration shown in FIG. 2. In addition, block 3.3 contains the predetermined corrective values Ks for the torsion vibration effects.

Downstream of block 3.3, the corrective values Ks, Ka, et cetera and Kv are coupled in logic elements 3.4 and 3.5 to a corrective value Kk=Kv−Ks−Ka for each cylinder. This corrective value Kk is compared to a reference value in logic element 3.6.

As a reference value, the corrective value of one individual cylinder (for example, the corrective value of the first cylinder) can be applied, for example, in a first alternative. Stated otherwise, in this alternative, the corrective values of the individual cylinders are only corrected relative to each other, namely, referred to the reference value of the first cylinder which is assumed to be correct. In the sequence, the cylinders are equalized relative to each other. The absolute level of the idle rpm is then adjusted via a higher-ranking control, that is, via an intervention which is the same for all cylinders.

As an alternative, all cylinders, that is, their segment times, can be referred to a mean rpm region. Per cylinder, a correct value then results which is also correct with respect to its absolute value.

The signal resulting from the logic coupling in logic element 3.6 is supplied to the cylinder-individual controllers 3.7, which form drive signals for actuators 3.8 therefrom, for example: for interventions into the fuel metering, into the quantity of supplied fresh air or recirculated exhaust gas or the ignition.

The following actuating interventions (1) to (5) can be carried out on the engine in dependence upon the occurring deviations:

1. Extending the injection time of the cylinders which supply less torque while simultaneously shortening the injection time of the cylinders which output more torque. In this way, the lengthening or shortening is so computed that the total fuel quantity is not affected; that is, the lambda value of the mixture with which the engine is driven is not changed. This concept serves, for example, for lean control at the pregiven lambda value and maximum smooth running or minimal rough running.
2. At the lean misfire limit, the difference of the actual Lut value to the Lut mean value becomes significantly larger. For a lean misfire limit, that rough running is taken for which there are just still stable combustions, for example, in homogeneous lean operation. The lean misfire limit is detectable with the above-mentioned method and can be controllable as required. In this concept, the lambda sum changes and therefore this is not a lean control; instead, it is a cylinder individual running boundary control. Block 2.1 can be omitted in this realization.
3. The ignition angles of an engine are stored in characteristic fields in present day systems and these characteristic fields are applicable for all cylinders. The control can therefore be so designed that, at first, an attempt is made to compensate a torque which is too low by an advanced ignition angle. Example: A coking or carbonization in the direct injector causes a torque of a cylinder which is too low. This cylinder runs lean. The optimal ignition angle for this lean mixture is more advanced and can be correspondingly adjusted. Likewise, a cylinder, which causes a high torque, can be influenced by a retarded ignition angle.
4. In systems with exhaust-gas recirculation, the possibility is present to reduce the exhaust-gas rate of recirculation in the event that the measured values fluctuate greatly. Here too, a lean misfire limit control is possible with the objective of maximizing the rate of exhaust-gas recirculation.
5. For a direct-injection engine, the outputted torque can be additionally changed in stratified operation by varying the injection time point.

It is understood that the foregoing description is that of the preferred embodiments of the invention and that various changes and modifications may be made thereto without departing from the spirit and scope of the invention as defined in the appended claims.

What is claimed is:
1. An electronic control arrangement for equalizing torque contributions of different cylinders of an internal combustion engine to the total torque of the engine which can operate in an overrun mode and in a fired mode, the electronic control arrangement comprising:

means for providing first quantities (Ka) of a rough running of said engine in said overrun mode and second quantities (Kvi) in said fired mode;

means for providing third quantities (Ksi) for a rough-running component based on torsion vibrations;

means for forming cylinder-individual fourth quantities (Kki) for said rough running from said first, second and third quantities with said fourth quantities being independent of the rough running in said overrun mode and independent of the rough-running component based on said torsion vibrations; and, means for equalizing said torque contributions on the basis of said fourth quantity.

2. The electronic control arrangement of claim 1, wherein said engine includes actuator means for operating on at least one of the following functions thereof: fuel metering to said engine, air supplied to said engine, the ignition, cylinder compression, drive of camshaft valves and drive of a swirl flap; the electronic control arrangement further comprising:

a plurality of controllers corresponding individually to respective ones of said cylinders; and, means for conducting said fourth quantities to said controllers wherein drive signals are formed for said actuator means to thereby intervene in at least one of said functions.

3. The electronic control arrangement of claim 2, wherein said arrangement functions to intervene individually or in combination as follows in dependence upon the deviations which occur on said engine:

extending the injection time of those ones of said cylinders which output less torque while simultaneously shortening the injection time of those ones of said cylinders which output more torque with the extending and shortening being so computed that the total quantity of fuel is unaffected and the lambda value of the mixture with which said engine is driven is not changed;

first compensating a torque which is too low by an advanced ignition angle;

with a system having exhaust-gas recirculation, reducing the rate of recirculating of the exhaust gas in the event that measured values fluctuate greatly;

with a system having variable control of the gas exchange valves, the control lines and/or the valve stroke is changed;

with a system having a charge movement flap, the position of the charge movement flap is changed;

with a system having a variable compression, the cylinder compression is changed;

with a system having a variable camshaft adjustment, the position and elevation of the inlet valve is changed; and, with a system having a swirl flap, the position of the swirl flap is changed.

4. The electronic control arrangement of claim 1, wherein said engine is a direct-injection spark-ignition engine or a diesel engine in stratified operation; and, the outputted torque is changed by varying the time point of injection.

5. The electronic control arrangement of claim 1, wherein said means for providing said first quantities (Ka) and said second quantities (Kvi) are adapted to detect the torque of said engine.

6. A method for equalizing torque contributions of different cylinders of an internal combustion engine to the total torque of the engine which can operate in an overrun mode and in a fired mode, the method comprising the steps of:

providing first quantities (Ka) of a rough running of said engine in said overrun mode and second quantities (Kvi) in said fired mode;

providing third quantities (Ksi) for a rough-running component based on torsion vibrations;

forming cylinder-individual fourth quantities (Kki) for said rough running from said first, second and third quantities with said fourth quantities being independent of the rough running in said overrun mode and independent of the rough-running component based on said torsion vibrations; and, equalizing said torque contributions on the basis of said fourth quantity.

7. The method of claim 6, wherein said engine includes actuator means for operating on at least one of the following functions thereof: fuel metering to said engine, air supplied to said engine, the ignition, cylinder compression, drive of camshaft valves and drive of a swirl flap; and, wherein the method comprises the further steps of:

providing a plurality of controllers corresponding individually to respective ones of said cylinders; and, conducting said fourth quantities to said controllers wherein drive signals are formed for said actuator means to thereby intervene in at least one of said functions.

8. The method of claim 7, wherein the method provides for intervening individually or in combination as follows in dependence upon the deviations which occur on said engine:

extending the injection time of those ones of said cylinders which output less torque while simultaneously shortening the injection time of those ones of said cylinders which output more torque with the extending and shortening being so computed that the total quantity of fuel is unaffected and the lambda value of the mixture with which said engine is driven is not changed;

first compensating a torque which is too low by an advanced ignition angle;

with a system having exhaust-gas recirculation, reducing the rate of recirculating of the exhaust gas in the event that measured values fluctuate greatly;

with a system having variable control of the gas exchange valves, changing the control lines and/or the valve stroke;

with a system having a charge movement flap, changing the position of the charge movement flap;

with a system having a variable compression, changing the cylinder compression;

with a system having a variable camshaft adjustment, changing the position and elevation of the inlet valve; and, with a system having a swirl flap, changing the position of the swirl flap.

9. The method of claim 6, wherein said engine is a direct-injection spark-ignition engine or a diesel engine in stratified operation; and, the outputted torque is changed by varying the time point of injection.

* * * * *